April 28, 1931.  1,803,024
E. J. LEVY, NOW BY JUDICIAL CHANGE OF NAME E. L. MAYO
HEATING SYSTEM AND CONTROL MECHANISM THEREFOR
Original Filed May 9, 1927    3 Sheets-Sheet 3

INVENTOR.
Edward Levy Mayo,
BY
Fay, Oberlin & Fay
ATTORNEYS.

Patented Apr. 28, 1931

1,803,024

UNITED STATES PATENT OFFICE

EDWARD J. LEVY, NOW BY JUDICIAL CHANGE OF NAME EDWARD LEVY MAYO, OF CLEVELAND HEIGHTS, OHIO, ASSIGNOR TO THE BISHOP & BABCOCK MANUFACTURING COMPANY, OF CLEVELAND, OHIO, A CORPORATION OF OHIO

HEATING SYSTEM AND CONTROL MECHANISM THEREFOR

Application filed May 9, 1927, Serial No. 189,839. Renewed February 7, 1929.

The present invention, relating as indicated to a heating system and a method of control therefor, is particularly directed to that type of system now in general use in office buildings, schools and the like, in which the heating fluid, whether water, steam or vapor, is admitted or not to the heating elements, such as the radiators, automatically, depending upon the temperature maintained in the room by means of a thermostatic device affected by the room temperature and control fluid pressure lines which lead to pressure motors, which in turn control the valves, admitting the heat fluid to the radiator. More particularly the present invention is directed to a system of that type in which it is desired to provide for rendering inoperative certain of the thermostatic control elements during certain periods of day or night, thus permitting the control system to be effective in certain places and ineffective in others with the result that heating fluid will only be admitted to the radiators upon a substantial predetermined temperature drop when desired. The invention also includes a new and improved thermostatic control element, together with means for operating the same to carry out the general methods of control referred to above.

To the accomplishment of the foregoing and related ends, said invention, then, consists of the means hereinafter fully described and particularly pointed out in the claims; the annexed drawings and the following description setting forth in detail one method and one product exemplifying my invention, such disclosed procedure and product constituting, however, but one of various applications of the principle of my invention.

In said annexed drawings:—

Figure 1:
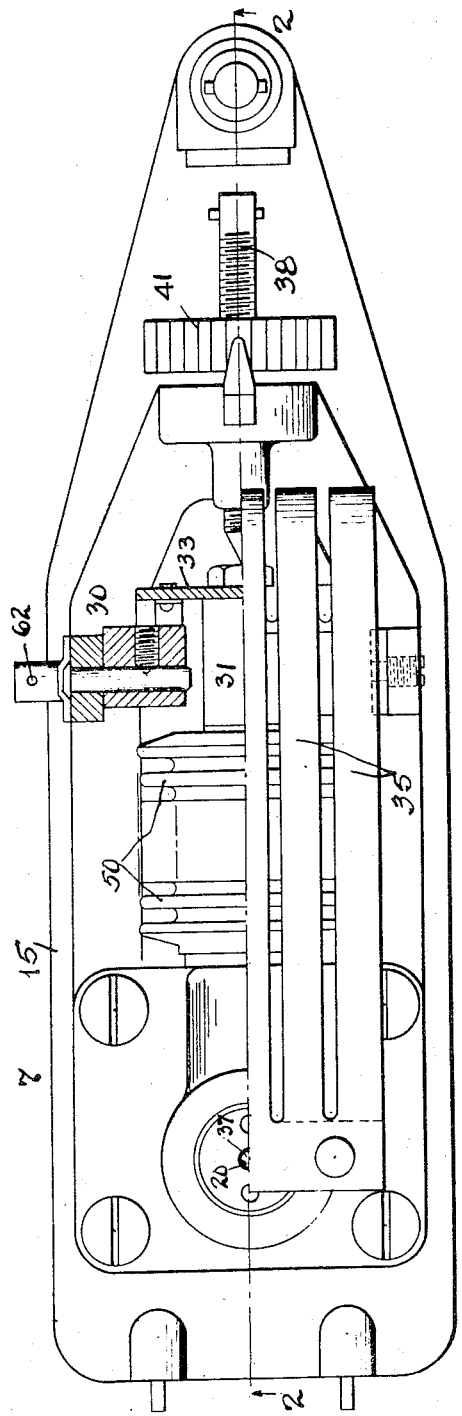
Figure 2:
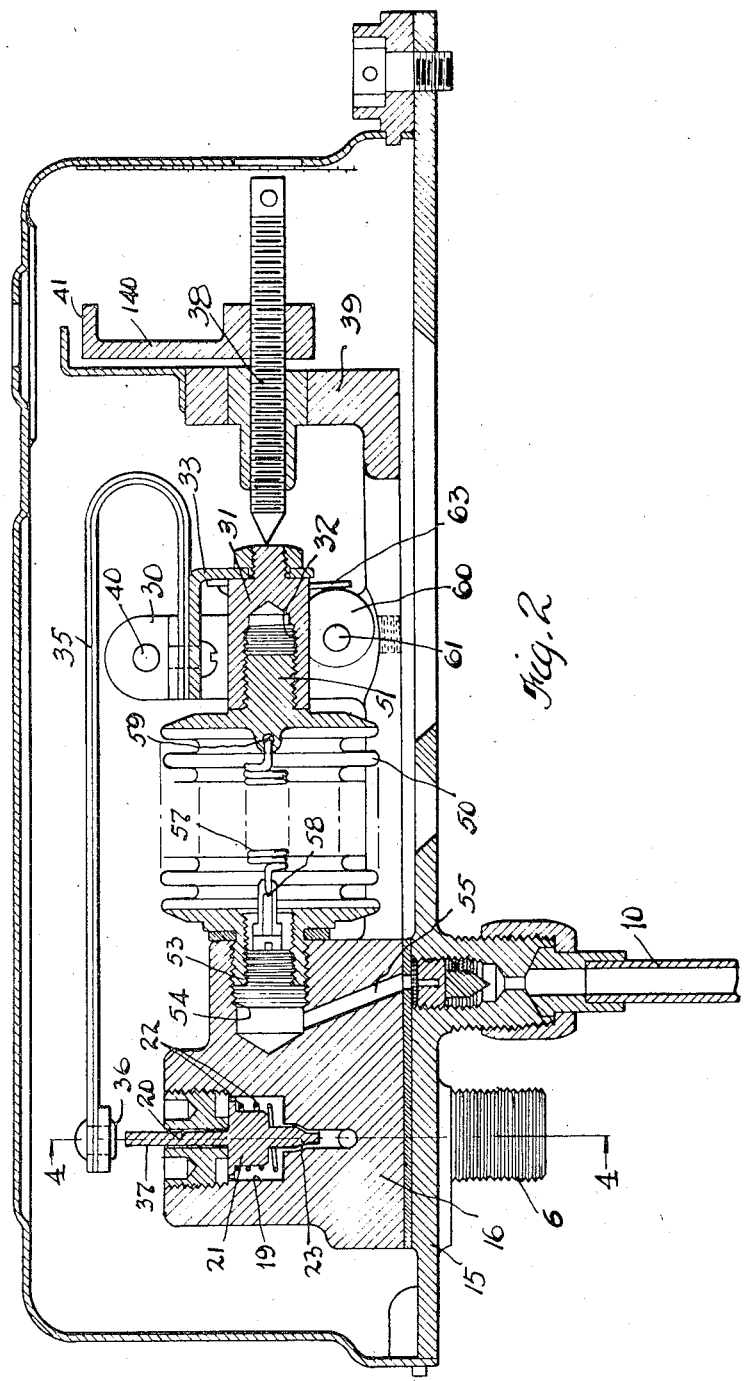
Figure 3:
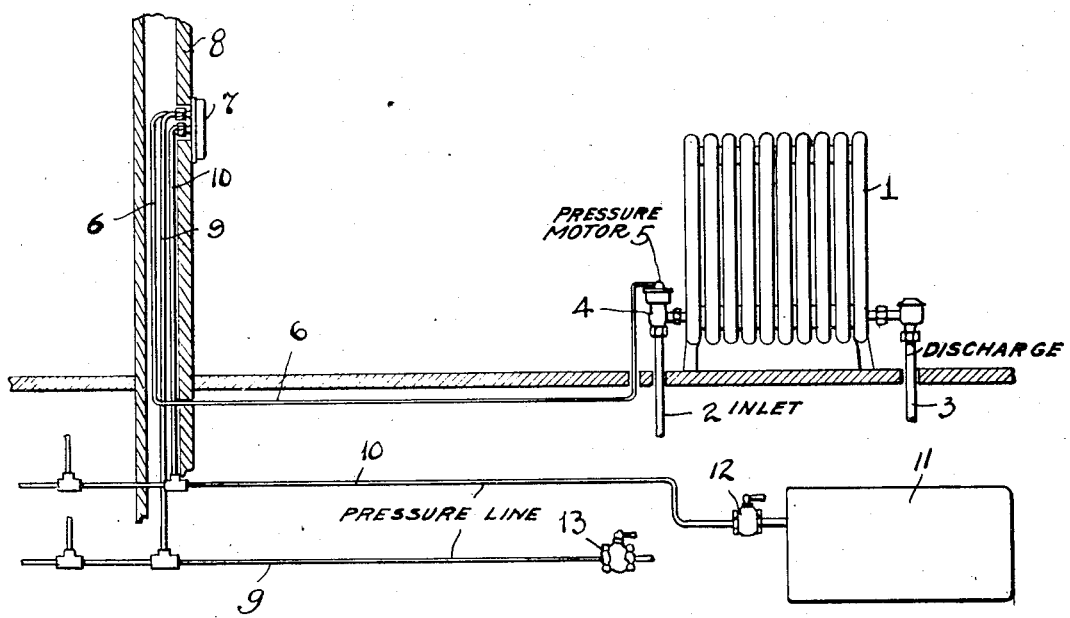

Fig. 1 is a plan view partially in section of my improved thermostatic control element; Fig. 2 is a section of the same on the line 2—2, Fig. 1; Fig. 3 is a side elevation more or less diagrammatic illustrating the connections between the control element and the heating element; and Fig. 4 is a section on the line 4—4, Fig. 2.

Referring now to Fig. 3 there is shown a heating element exemplified by a radiator 1 provided with an incoming conduit 2 and a discharge conduit 3. Mounted in the incoming conduit is a valve 4 controlled by a pressure motor 5, the details of which are not shown as any suitable standard type of fluid pressure operated motor may there be employed for opening or closing the valve 4, and thus admitting heating fluid to the radiator. The pressure motor 5 is operated by means of fluid pressure carried thereto through a conduit 6 and from the thermostatic control element 7, which is mounted in a convenient location on the wall 8 of the room in which the radiator is disposed. Also leading to the thermostatic control element are two fluid pressure conduits 9 and 10, both of which lead to a suitable source of fluid pressure, such as the reservoir 11, while each of the lines is provided with a suitable control valve 12 and 13. The pressure motor and motor operated valve at the radiator may be of the type illustrated in United States Letters Patent No. 1,615,825, issued to F. K. Bezzenberger and Wm. R. Zimmerman, in which normally air pressure is maintained in the motor which then maintains the valve in a closed position. Upon a lowering of the temperature in the room the thermostatic control device is designed to release the air pressure from the pressure motor, thus permitting the spring in the latter to open the valve and allow steam or water to flow through the radiator.

Figure 4:
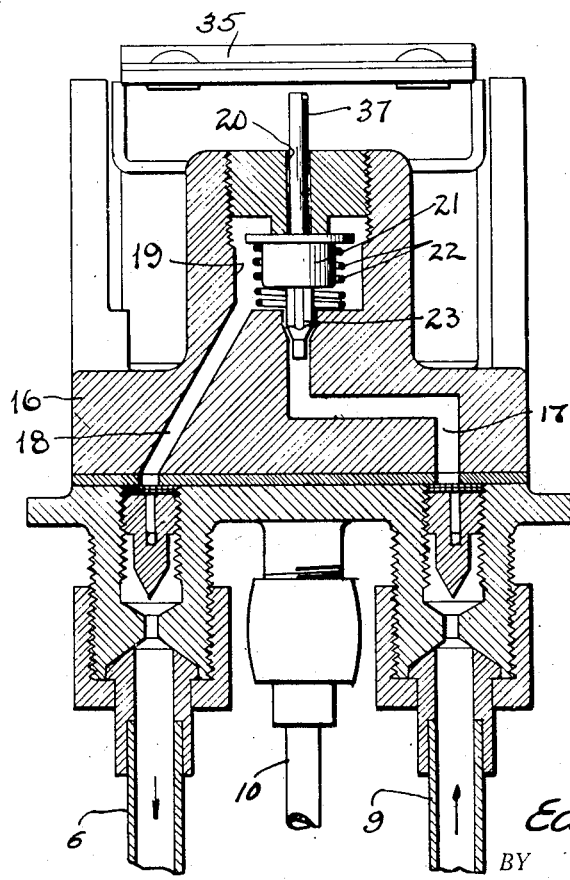

The thermostatic control device for controlling the operation of the pressure motor is shown in Figs. 2 and 4, and consists of a base plate 15, which may be secured to the wall or any other suitable point in the room and on which is mounted a casing 16 which is provided with inlet and outlet ports 17 and 18, respectively, leading to a fluid pressure chamber 19, which is also provided with a leak port 20 normally closed by means of a valve 21 and spring 22. This valve 21 is also provided with a second valve on its other end 23 adapted to close the conduit from the incoming port 17. Connected to the incoming port 17 is the conduit 9 leading from the reservoir, and connected to the discharge port 18 is a second conduit through which the conduit 6 leads to the pressure motor 5. In the normal operation of the device, or rather the device in the condition illustrated in Fig. 4, the leak port 20 is closed and the passageway leading from the port 17 to the port 18 is open, thus allowing fluid pressure to pass through the chamber 19 to the pressure motor and maintain the valve 4 in a closed position, shutting off the flow of heating fluid to the radiator.

Pivotally mounted on upstanding arms or brackets 30, carried on the base plate 15, is a support 31 carried by an angle plate 33 which, together with a U-shaped bimetallic thermostatic element 35 are secured to the support 31. The element 35 carries at its extending or free end a contact element 36 adapted to engage, under certain conditions, to be presently described, with the extending stem 37 of the leak port valve 21. The thermostatic bar 35 is thus allowed a certain pivotal movement about the axis 40, on which the support 31 is mounted, the limiting position in a counter-clockwise direction being controlled by means of an adjusting screw 38 carried in a projection 39 on the base plate and actuated by means of a handle 140 carried on a dial 41. The normal position of the thermostatic bar is shown in Fig. 2, in which position the end of the bar is out of contact with the leak port, but upon lowering of the temperature of the room a contraction of the bar results, bringing the contact button into contact with the extending stem of the leak port valve, depressing the latter, closing the incoming line from the port 17, allowing the fluid pressure of the valve 4 to escape through the leak port 20, and permitting the heating fluid to enter the radiator to raise the temperature of the room.

As already stated, the adjusting screw 38 normally fixes the position of the bracket 33, socket 31 and also the thermostatic bar 35, and this position is also fixed by means of a fluid pressure motor in the form of an expansible and collapsible corrugated tubular wall or bellows 50 provided with an extended threaded shank 51, which is engaged with the socket 32 and with the second hollow extending end 53, which is similarly engaged within a suitable threaded opening 54 in the base plate 16. This bellows element is thus connected to the thermostatic bar through the medium of the angle plate 33 and the socket 31 and as fluid pressure is maintained within the bellows it will normally press the socket 31 against the adjusting screw 38 and maintain it in that position. Fluid pressure is admitted to the interior of the bellows by means of a port 55 formed in the element 16 and a conduit 10 already referred to and leading to a pressure reservoir. A spring 57 is engaged with a fixed element 58 at the inner or fixed end of the bellows and with a lug 59 on the movable or right-hand end of the bellows, and upon the release of the fluid pressure from the interior of the bellows this spring will contact, tilting the thermostatic bar about its axis 40, and lifting the end of the bar into such position that no normal contraction of the bar in reduction of temperature will bring it into contact with the leak port stem. In this way the thermostatic element is rendered inoperative under certain conditions and fluid pressure from the same reservoir as that supplying fluid pressure to the fluid pressure motor may be employed to thus maintain the thermostatic element normally in operation. The fluid pressure is released from the bellows by the valve 12, which is a two-way valve, adapted either to permit pressure fluid from the reservoir 11 through the conduit 10 and to the bellows, or to close the line from the reservoir, and permit the fluid pressure into the bellows and in the line between the bellows and the valve to escape in the atmosphere at the valve.

Under normal conditions the valves controlling the heating conduits, that is, the conduits 2 leading to one or more radiators in the system are closed by reason of the air pressure which is maintained in the fluid pressure motors 5, which operate these valves. Under these conditions air pressure from the reservoir is maintained in the valve chamber 19 and into conduits leading to and from the ports 17 and 18. The leak port valve 21 is in its upper position as shown in Fig. 4, closing the leak port, and the bimetallic element 35 is in the position shown in Fig. 2 and out of contact with the leak port stem 37. If now it is desired to render inoperative the thermostatic devices in the system, whether one or more, it is only necessary to release the pressure on the bellows elements 50 by means of the valve 12. As soon as this fluid pressure is released spring 57 in the bellows member contracts the latter and positions the element 35 so that it cannot engage with the leak port. Ordinarily, in a school building, for example, this operation will be effected at the close of the day, thus rendering ineffective and inoperative all of the thermostatic devices in the various rooms, so that during the night the reduction in temperature in the rooms will not affect these devices or cause heat to be turned into the rooms except upon a substantial predetermined temperature drop to prevent freezing temperatures in the rooms. It is very desirable, however, and particularly in school buildings and the like where one or more rooms are to be used during the evening, either for night classes, meetings or similar purposes, to turn off the thermostatic control generally, while allowing thermostatic control to continue on the rooms which are to be in use. I have provided a simple means for locking any desired thermostatic element into an operative position so that it may continue to function regardless of the cutting off of the balance of the thermostatic control for the building. This means consists of a cam 60 carried on a shaft 61 and adapted, upon being rotated by the extending handle 62, to engage against a plate 63 depending from the angle plate 33. Rotation of the cam in a clockwise direction and into the position shown in Fig. 2 will bring it into contact with this plate 63, locking the socket 31 and plate 33 against the adjusting screw 38, and thus taking the place of the fluid pressure actuated means consisting of bellows 50 for accomplishing the same result. If a certain room is to be used during the evening it is therefore only necessary, either before or after the fluid pressure has been released through the valve 12, to turn the cam 60 in the particular room selected into the position shown in Fig. 2, thus either maintaining the thermostatic element in position to engage and operate the leak port stem, or returning this element into such position if the air pressure has already been released from the motors 50. In the morning when the system is again placed in operation by returning pressure to the line 10, and through which to the various bellows motors, the cams may be released and the system will operate as before.

My improved device and system provide an extremely simple and effective means for selectively placing in or out of operation any desired units of the thermostatic control means for a multiple room heating system and accomplishes this result from a single reservoir and on a single air pressure, thus avoiding certain of the complications and difficulties which are attendant upon control systems requiring either periodic step-by-step operation of the thermostatic elements or a multiplicity of air pressures and air lines leading to the thermostatic elements.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a base, a fluid pressure chamber formed therein and provided with ports for connection to inlet and discharge conduits, a combined flow-control valve and vent valve formed in said chamber, a thermostatic element adapted to control said combined flow and vent valve, fluid pressure means normally maintaining said thermostatic element in operative relation to said combined flow and vent valve, means for connecting said fluid pressure means to said thermostatic element and means operable upon the release of said fluid pressure means adapted to render said thermostatic element inoperable.

2. In a system of the character described, a device for controlling the flow of a heating medium, a first pipe leading from a source of fluid pressure, a second pipe leading to said device, a valve between said pipes for normally permitting fluid to pass from the former to the latter, a thermostat for operating said valve to release pressure from said second pipe and to seal said first pipe, means for controlling said thermostat in its action with relation to said valve, a third pipe leading from said controlling means to a source of fluid pressure, and means for varying the pressure in said third pipe for regulating said controlling means.

3. In a system of the character described, a valve for controlling the flow of a heating medium, a line connected with such valve for containing a fluid under pressure for normally maintaining such valve closed, a valve operable to vent such pressure from a section of said line for permitting such first-named valve to open, a thermostat for controlling such second named valve, a line connected with such thermostat and containing a fluid under pressure for normally maintaining such thermostat in operative relation to such second named valve, and means for venting such pressure of such second named line for permitting such thermostat to assume an inoperative relation to said second named valve, said last named means being operable independently of the pressure in such first named line.

4. In a heating system, a valve for controlling the flow of a heating medium, fluid pressure means for controlling such valve, a thermo-sensitive device for regulating said controlling means, and other and independent fluid pressure means for controlling said thermo-sensitive device, said last-named fluid pressure means being operable independently of said first-named fluid pressure means.

5. In a system of the character described, a device for controlling a heating conduit, fluid pressure means for regulating said device, a thermostat for controlling said regulating means, remote fluid pressure means for operatively and inoperatively positioning said thermostat without normally materially affecting said regulating means, and proximate mechanical means for operatively and inoperatively positioning said thermostat without normally materially affecting said regulating means.

6. In a system of the character described, a device for controlling the flow of a heating medium, a valve, a pipe leading from a source of fluid pressure to said valve, a pipe leading from said valve to said device, a thermostat for operating said valve to release pressure from said second named pipe, means for controlling said thermostat with relation to its effect on said valve, a pipe leading from said controlling means to a source of fluid pressure, and means for varying the pressure in said last named pipe for regulating said controlling means.

7. In a system of the class described, a pressure motor operated valve controlling the flow of a heating medium, a source of fluid pressure, a valve controlling the admission of said fluid pressure to said motor, a thermal element controlling said latter valve, a pivotal mounting for said thermal element, pressure means for moving the thermal element about its pivot, and a separate connection to said source of fluid pressure for admitting pressure to said means to cause it to move said thermal element about its pivot into operative relation with said latter valve.

8. In a system of the class described, a pressure motor operated valve controlling the flow of a heating medium, a source of fluid pressure, a valve for admitting and retracting fluid pressure to said motor, a thermal element having a free end engageable with said valve to control it responsive to temperature changes in the room, a pivotal mounting for the fixed end of said element, pressure means for moving the thermal element about its pivot, and a separate connection to said source of fluid pressure for admitting pressure to said means to cause it to move said thermal element about its pivot into operative relation with said latter valve.

9. In a system of the character described, a device for controlling the flow of a heating medium, a source of fluid pressure of constant value, a first pipe leading from said source, a second pipe leading from said controlling device, a valve between said pipes for normally permitting fluid to pass from the former to the latter for operating said control device to prevent the flow of heating medium, a thermostat for operating said valve to cause it to release pressure from said second pipe and to simultaneously seal said first pipe, means for controlling said thermostat in its action with relation to said valve, a third pipe leading from said controlling means to a source of fluid pressure, and means for varying the pressure in said third pipe for regulating said controlling means.

10. In a system of the character described, a device for controlling the flow of a heating medium, a source of fluid pressure of constant value, a first pipe leading from said source, a second pipe leading from said controlling device, a valve between said pipes for normally permitting fluid to pass from the former to the latter for operating said control device to prevent the flow of heating medium, a stem on said valve, a thermostat engaging said stem to operate the valve and release pressure from said second pipe and to seal said first pipe, means for controlling said thermostat in its action with relation to said valve, a third pipe leading from said controlling means to a source of fluid pressure, and means for varying the pressure in said third pipe for regulating said controlling means.

Signed by me, this 28th day of April, 1927.

EDWARD J. LEVY.